Jan. 8, 1929.  
H. SCHILDKNECHT  
1,698,026  
DRIVING DEVICE FOR MULTIAXLE MOTOR VEHICLES  
Filed June 22, 1926

INVENTOR  
H. Schildknecht  
By Marks & Clerk  
Attys.

Patented Jan. 8, 1929.

1,698,026

UNITED STATES PATENT OFFICE.

HEINRICH SCHILDKNECHT, OF STUTTGART, GERMANY, ASSIGNOR, BY MESNE ASSIGNMENTS, TO DAIMLER-BENZ AKTIENGESELLSCHAFT, OF BERLIN, GERMANY.

DRIVING DEVICE FOR MULTIAXLE MOTOR VEHICLES.

Application filed June 22, 1926, Serial No. 117,839, and in Germany July 20, 1925.

This invention relates to a driving device for the road wheels of a multi-axle motor vehicle. It consists in this, that the transmission shaft arranged between any two axles of the vehicle is arranged with respect to the driving device of the pair of wheels of any axle in such a way that the said wheels may be assembled together with this driving device independent of the axle.

The invention may be carried out by mounting the transmission shaft which is arranged between two vehicle axles on the support of the driving arrangement of the differential shafts of the one pair of driving wheels, and fixing this support detachably to the appropriate vehicle axle; and furthermore constructing the driving device of the pair of wheels of the one axle so as to project into a casing fixed on to the said axle, the end of the casing being constructed in the form of a ball socket for taking the thrust of the other axle.

In contradistinction to the known arrangements, the invention has, in addition to a well finished and appropriate construction, the further advantage that the assembly and taking apart, and in particular the alignment of the intermediate shaft, are considerably facilitated.

The invention is illustrated by way of example by the accompanying drawings, in which:—

Figure 1:
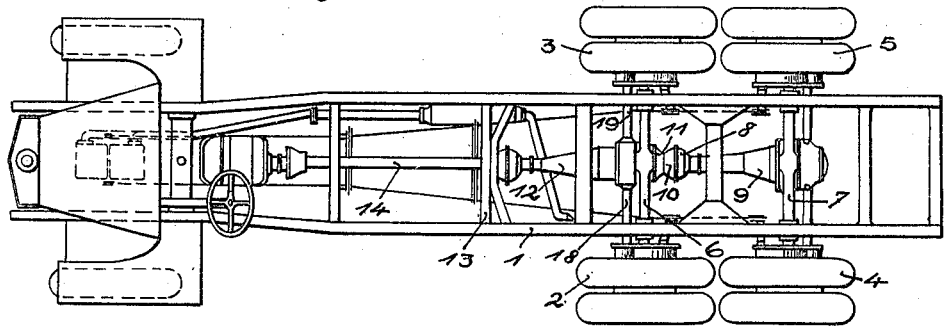
Figure 1 is a plan of a lorry with two driving axles and with a driving device according to the invention.
Figure 2:
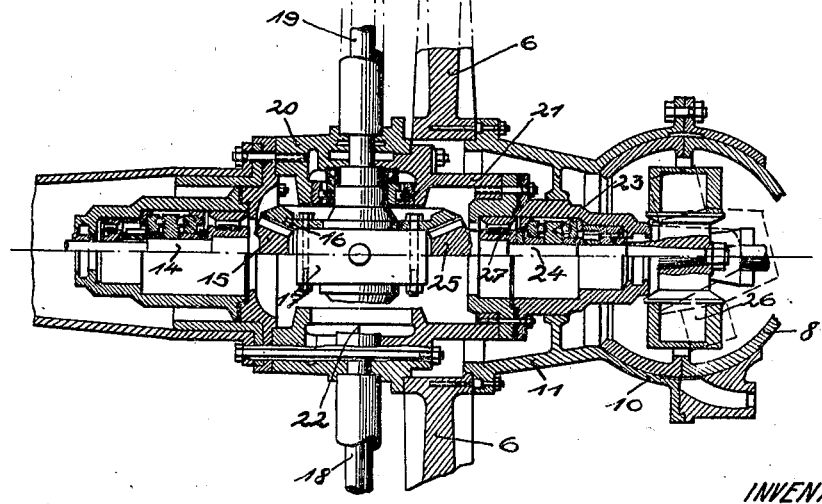
Figure 2 represents the driving device and the intermediate shaft partly in section, according to the invention.

The frame 1 of the vehicle carries in the front the engine, which drives the differential gear of the front pair of driven road wheels 2, 3 in a known way, and which also drives the rear pair of road wheels 4, 5 by means of the intermediate shaft which is described in greater detail below, and by means of a second differential. The front road wheels 2, 3 are fixed on the axle 6 of the rear road wheels 4, 5 on the axle 7. The thrust of the rear axle 7 is transmitted by means of the ball socket 8 of the thrust pipe 9 to the ball socket 10 of the casing 11 and thence to the axle 6. From this axle the combined thrust of the vehicle is further conveyed by the thrust pipe 12 to the cross member 13 of the vehicle frame.

The motive power is transmitted from the engine to the differential casing 17 by the shaft 14 by means of the pair of wheels 15, 16. The road wheels 2 and 3 receive their drive by means of the differential shafts 18 and 19. Differential shafts and differential gear are mounted in one casing, which consists of the two parts 20 and 21. The dividing joint 22 of the casing is preferably placed at the middle of the differential shafts 18 and 19. The part 21 of the casing contains the different bearings 27 and 23 of the intermediate shaft 24, which has a toothed wheel 25 engaging with the toothed wheel 16. The joint 26 is connected to the intermediate shaft 24, which joint transmits the drive of the adjacent pair of wheels.

The driving mechanism for the pair of wheels 2, 3 which are to be driven by the differential shafts 18, 19, and the mount for the intermediate shaft 24 are connected by means of the casing 20, 21 in such a way that they may be assembled independently of the axle 6 and of the casing 11.

The end of the casing 11 is constructed in the form of a ball socket 10 in which the ball socket 8 lies. The vehicle thrust is thereby transmitted to the axle 6, as described above, from the adjacent pair of driven road wheels 4, 5. The casing 20, 21 of the driving arrangement is thus relieved from the vehicle thrust of this axle.

What I claim is:—

1. In a motor vehicle having a plurality of pairs of driven road wheels arranged one pair behind the other, the combination with a driving motor of a supporting axle for one pair of driven road wheels, a supporting axle for supporting a second pair of driven road wheels, a driving device for driving the said second pair of driven road wheels, a power transmission unit comprising a driving device for driving said first mentioned pair of driven road wheels and a transmission shaft for operatively connecting said driving device to the driving device of the second pair of road wheels, said unit being mounted on the vehicle and capable of being assembled independently of the axle of the said first pair of driven road wheels and the driving device of the said second pair of driven road wheels, a casing fixed to the supporting axle of the said first mentioned pair of road wheels, said casing having a ball socket, a thrust tube fixed to the axle of the second pair of road wheels and having a spherical shaped end engaging in said ball socket, and means for operatively connecting the driving device of the first pair of road wheels to the motor, for the purpose set forth.

2. In a motor vehicle having a plurality of pairs of driven road wheels arranged one pair behind the other, the combination with a driving motor of a supporting axle for one pair of driven road wheels, a second supporting axle for supporting a second pair of driven road wheels behind said first mentioned supporting axle, a driving device for driving said second pair of driven road wheels and means for operatively connecting said driven road wheels to the driving motor and including a power transmission unit comprising a driving device for driving said first mentioned pair of driven road wheels and a transmission shaft operatively connected to said driving device and to the driving device of said second pair of driven road wheels, said power transmission unit being an independent assembly capable of being mounted on the vehicle and removed therefrom as a whole without disturbing the supporting axle of the first mentioned pair of driven road wheels or the driving device of the second mentioned pair of driven road wheels, for the purposes set forth.

3. In a motor vehicle having a plurality of pairs of driven road wheels arranged one pair behind the other, the combination with a driving motor of a supporting axle for one pair of driven road wheels, a second supporting axle for supporting a second pair of driven road wheels arranged behind said first mentioned supporting axle, a driving device for driving said second pair of driven road wheels and means for operatively connecting said driven road wheels to the driving motor and including a power transmission unit comprising a casing mounted on the supporting axle of the first mentioned pair of driven road wheels, a differential for driving said first mentioned pair of driven road wheels inside said casing, a transmission shaft inside said casing in direct driving engagement with said differential and coupled to the driving device of the second pair of driven road wheels, said casing together with the differential and transmission shaft within it being an independent assembly capable of being removed from the supporting axle of the first mentioned pair of driven road wheels as a whole without disturbing the supporting axle of the first mentioned pair of driven road wheels or the driving device of the second mentioned pair of driven road wheels, and a driving shaft in direct driving engagement with the said differential and operatively connected to the driving motor, for the purposes set forth.

In testimony whereof I have signed my name to this specification.

HEINRICH SCHILDKNECHT.